US007823064B1

(12) United States Patent
Levy

(10) Patent No.: US 7,823,064 B1
(45) Date of Patent: Oct. 26, 2010

(54) INTERLEAVING COMPRESSED ARCHIVES WITHIN A PAGE DESCRIPTION LANGUAGE FILE

(75) Inventor: Philip Levy, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 365 days.

(21) Appl. No.: 11/848,056

(22) Filed: Aug. 30, 2007

(51) Int. Cl.
*G06F 17/00* (2006.01)

(52) U.S. Cl. .................................. 715/242; 707/661

(58) Field of Classification Search ................ 707/101, 707/104.1, 204, 205, 661, 665, 667, 668, 707/673; 715/200, 202, 204, 205, 210, 230, 715/250, 252, 253, 254, 273, 276, 234, 242
See application file for complete search history.

(56) References Cited

U.S. PATENT DOCUMENTS

| | | | | |
|---|---|---|---|---|
| 5,506,985 | A * | 4/1996 | Motoyama et al. .......... 715/234 |
| 6,044,385 | A * | 3/2000 | Gross et al. ................. 715/205 |
| 2002/0029228 | A1 * | 3/2002 | Rodriguez et al. .......... 707/204 |
| 2007/0204210 | A1 * | 8/2007 | Gormish et al. ........... 715/500.1 |
| 2008/0162530 | A1 * | 7/2008 | van Eikeren et al. ........ 707/102 |
| 2008/0189601 | A1 * | 8/2008 | Goldman ..................... 715/242 |

* cited by examiner

*Primary Examiner*—Greta L Robinson
(74) *Attorney, Agent, or Firm*—Schwegman Lundberg & Woessner, P.A.

(57) ABSTRACT

Various embodiments described herein provide systems, methods, software, and data structures that allow a page description language reader application, such as Adobe® Acrobat®, to provide a view of the assets compressed within a compressed archive. These and other embodiments including applications that may interleave one or more compressed archives within a page description language file, such as a PDF file. This interleaving leverages properties of both compressed archive files and page description language files to insert object markers around compressed assets within the compressed archives and references to at least some of the object markers in an index portion of the page description language files. As a result, compressed assets of compressed archives included in a page description language file package may be viewed within the listing of assets of the page description language file. These and other embodiments are described in greater detail below.

10 Claims, 6 Drawing Sheets

FIG. 2

```
%PDF?1. 4
1 0 obj
     << /Type /Catalog
        /Outlines 2 0 R
        /Pages 3 0 R
     >>
endobj
COPMRESSED ARCHIVE HEADER
COMPRESSED FILE 1 HEADER ( . . .
2 0 obj
     << /Length 99
        stream)
. . . COMPRESSED FILE 1 BYTES . . .
        endstream
endobj COMPRESSED FILE 2 HEADER ( . . .
3 0 obj
     << /Length 99
        stream)
. . . COMPRESSED FILE 2 BYTES . . .
        endstream
endobj

COMPRESSED ARCHIVE TRAILER 4 0 obj
     [ /PDF ]
endobj xref
0 7
0000000000 65535 f
0000000009 00000 n
0000000074 00000 n
0000000120 00000 n
0000000179 00000 n
0000000300 00000 n
0000000384 00000 n trailer
     . . . trailer index to objects . . .

startxref
%%EOF
```

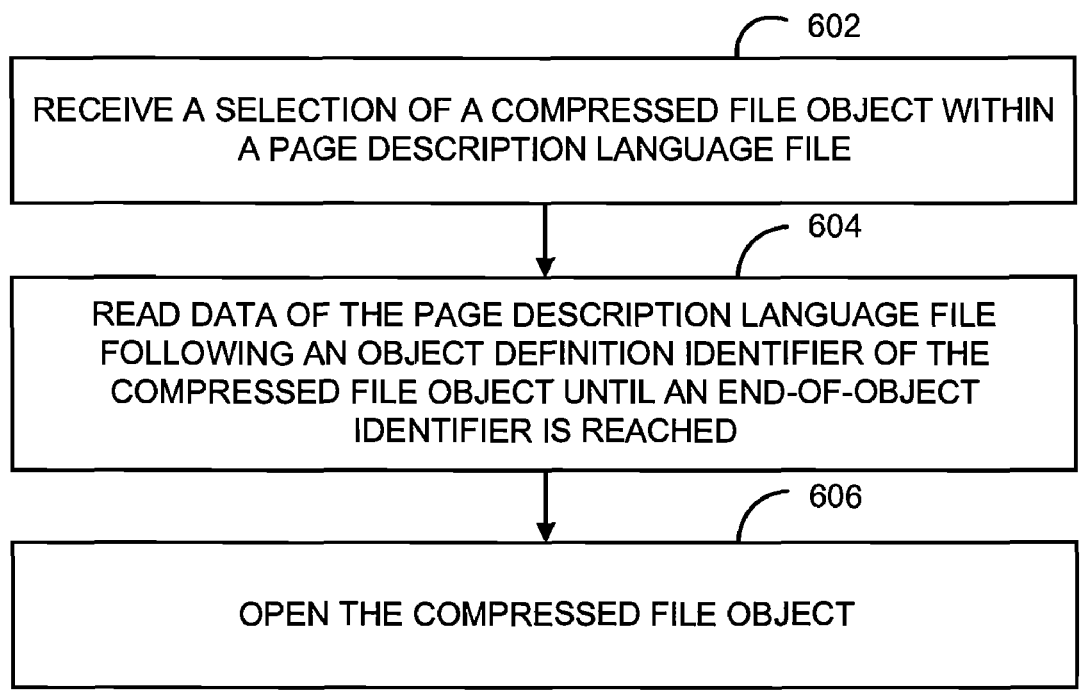

US 7,823,064 B1

INTERLEAVING COMPRESSED ARCHIVES WITHIN A PAGE DESCRIPTION LANGUAGE FILE

BACKGROUND INFORMATION

Using a standard compressed packaging format such as ZIP has many advantages for packaging assets, such as documents, spreadsheets, graphics, and other files types. However, when placing a compressed archive within a page description language file, such as Portable Document Format ("PDF"), the entire compressed archive must be opened to view the compressed assets of the compressed archive and to open the compressed assets.

BRIEF DESCRIPTION OF THE DRAWINGS

FIG. 2 is a representation of a page description language file including an interleaved compressed archive according to an example embodiment.

FIG. 6 is a logical block flow diagram of a method according to an example embodiment.

DETAILED DESCRIPTION

Figure 1:
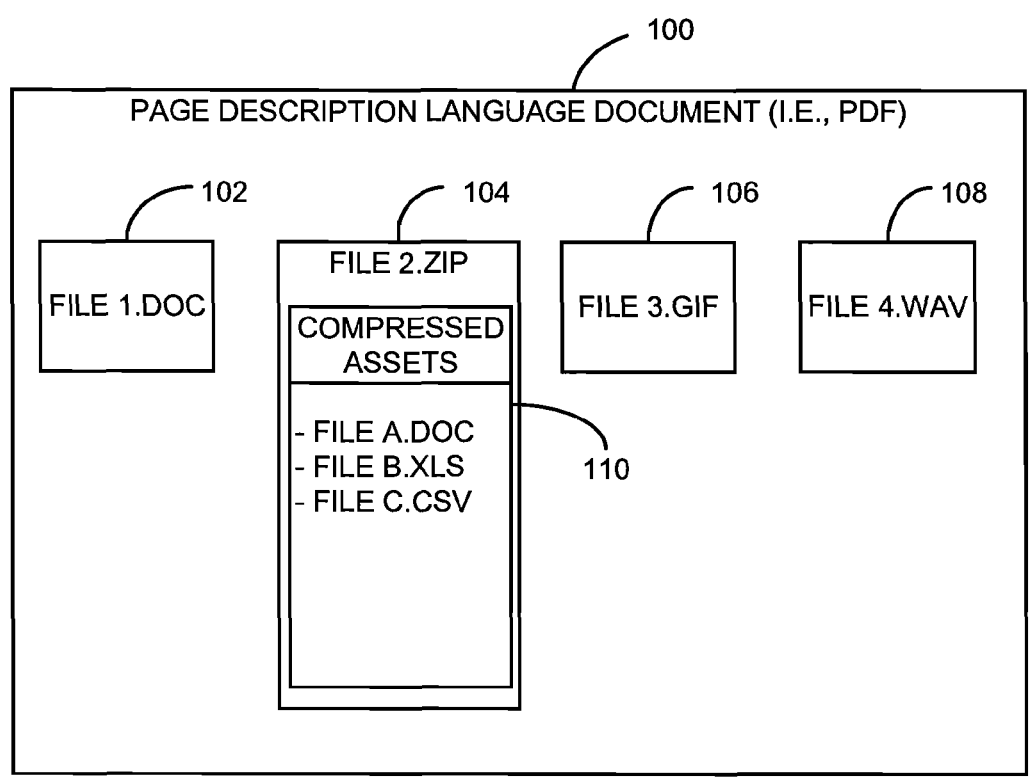
FIG. 1 provides a logical illustration of a page description language file with assets embedded therein according to an example embodiment.

Page description language documents, such as documents encoded in ADOBE SYSTEMS INCORPORATED's Portable Document Format ("PDF"), may be used to package several assets, such as documents, spreadsheets, images, video, sound clips, other page description language documents, and the like. For example, FIG. 1 provides a logical illustration of a page description language file 100 with three assets, a document file 102, a compressed archive 104, an image file 106, and a sound file 108 embedded therein according to an example embodiment. The PDF file, when opened provides an interface from which to view a listing of the assets 102, 104, 106, and 108 embedded therein. The individual assets may be selected within this user interface to cause a computing device to open them. The assets will be opened by a program designated within an operating system of the computing device to open files of the type of the selected asset.

However, as mentioned above, if one of the embedded assets is a compressed archive 104, compressed files of the compressed archive are not visible. Instead, only the compressed archive asset may be viewed. Selecting the compressed archive will cause a program designated within the operating system to open compressed archives to open the selected compressed archive.

Various embodiments described in greater detail below provide systems, methods, software, and data structures that allow a page description language reader application, such as ADOBE® ACROBAT®, to provide a view of the assets 110 compressed within a compressed archive 104. These and other embodiments including interleaving one or more compressed archives 104 within a page description language file, such as a PDF file. This interleaving leverages properties of both compressed archive files and page description language files to insert object markers around compressed assets within the compressed archives and references to at least some of the object markers in an index portion of the page description language files. As a result, compressed assets of compressed archives included in a page description language file package may be viewed within the listing of assets of the page description language file. The assets of a compressed archive included within a page description language file, as well as other assets of the page description language file, may be selected from this listing and opened. These and other embodiments are described in greater detail below.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Embodiments may, for example, be implemented as a stand-alone application (e.g., without any network capabilities), a client-server application or a peer-to-peer (or distributed) application. Embodiments may also, for example, be deployed by Software-as-a-Service (SaaS), Application Service Provider (ASP), or utility computing providers, in addition to being sold or licensed via traditional channels.

The various embodiments described herein takes advantage of ability in page description language files, such as PDF, to have extra bytes in between objects, such as a COS object in a PDF file, and a compressed archive's ability to have extra bytes in between objects, such as files. A COS object is an object of the PDF object system used to represent the internal objects of a PDF document. A PDF document, for example, may be created with a single page describing what is in the package and has file attachment annotations for each object in the package. In the middle of the PDF, a compressed archive is interleaved that contains the actual assets to be packaged. In front of each entry in the compressed archive, a stream dictionary is created. The stream dictionary occupies an extension field in a compressed archive defined header for each compressed file. The compression algorithm used to compress the compressed files of a compressed archive typically matches a compression technique identified in the PDF stream dictionary. For example, if a compressed archive is built using flate compression, the PDF stream identifies that the stream data, such as compressed file, is flate compressed. The "endstream" line is placed after each compressed file. The next compressed file entry then follows. The stream dictionaries are then referenced from the file attachment annotations or embedded file entries. Although PDF stream objects are discussed, other object types may be used, such as embedded file objects and other objects depending on the requirements of a particular embodiment, file, or user or organizational preferences.

FIG. 2 is a representation of a page description language file including an interleaved compressed archive according to an example embodiment. The page description language file is an example PDF document 200 embodiment. Although a PDF document 200 is illustrated, the same subject matter is equally applicable to other page description languages.

The example PDF document 200 leverages properties of the PDF document standard as set by ADOBE SYSTEMS INCORPORATED of San Jose, Calif. This standard allows for space between objects that is unused by applications that read and generate graphical representations of PDF documents. The example PDF document 200 also leverages properties of compressed archive standards, one of which is ZIP set by PKWARE INC. of Milwaukee, Wis. The leveraged compressed archive properties include the ability for there to be unused space between compressed files included in a compressed archive. Another compressed archive property that may be leveraged includes the ability to add space to an end of a compressed file header that is located at the beginning of each compressed file of a compressed archive. As used herein, a compressed archive is intended to represent a compressed archive file including one or more compressed assets. An asset may be used interchangeably with the term file and no difference is intended unless expressly stated otherwise. The term compressed archive is intended to represent a data structure holding assets that are compressed. Examples of compressed archives include files with extensions such as .zip, as mentioned above, .lzw, lzh, .arc and other extensions of files that may hold one or more compressed assets.

Leveraging the ability to have unused space in both the PDF document 200 and a compressed archive, these unused spaces may be used to interleave a compressed archive within the PDF document 200. Further, a view of the compressed files within a compressed archive may be given through the PDF document by adding PDF document 200 object marker in the compressed file header of each compressed file.

The representation of the PDF document 200 provides a view of what such an interleaving may look like. The PDF document 200 includes several objects. Between an end-of-object marker 202 of a first object and an object marker 212 of a second object, unused space may already exist or bytes of the PDF document 200 may be shifted to create needed space. In this space, a compressed archive begins with a compressed archive header 204. Next, also in this unused space, is compressed file header 210 for a first compressed file. This first compressed file header 210 includes an object marker 212 followed by information about the object, which is the compressed data of the first compressed file. The bytes of the first compressed file 216 are included following the first compressed file header 210 which ends at 214. Following the first compressed file bytes 216 is an end-of-object marker 220 comprising an "endstream" and "endobj" together marking the end of the first compressed file bytes 216.

Between the end-of-object marker 220 of the second object and an object marker of a third object of the PDF document 200 is a compressed file header 222 of a second compressed file. In an similar fashion to the first compressed file, the second compressed file header 222 includes a portion where PDF document 200 data is added to mark a start of the third object and other data, which may include data identifying a length in a number of bytes of the compressed file or a starting point for the data of the object which may or may not be a next byte of the PDF document 200 file. Following an end 226 of the second compressed file header are the bytes 228 of the second compressed file. Following the second compressed file bytes 228 is an end of object marker 232 comprising an "endstream" and "endobj" together marking an end of the second object.

Next in the PDF document 200, but before a fourth object 208, if there is a fourth object 208, or before a next portion of the PDF document 200 if there are not any further objects, is a trailer 206 of the compressed archive. The compressed archive trailer 206 is in a position where it is not referenced by the PDF document 200.

As with conventional PDF document 200 objects, each object associated with a compressed file object, such as the second and third objects of the PDF document 200 includes a reference in the PDF document 200 trailer 234. These PDF document 200 trailer references provide information to a PDF reader or editing application about the compressed file objects included within the PDF document 200. This information typically includes a starting location of the data of the compressed file and information about the compressed file such as a file name and may include other information.

A PDF document 200 may be assembled all at once, including the compressed files, by a PDF authoring tool. However, a PDF document may be preexisting without any compressed archive attachments. In such embodiments, a PDF authoring tool may shift bytes of the preexisting PDF document to create room to interleave one or more compressed archives within the document. Further details and embodiments to build and read page description language files, such as PDF document 200, are provided below.

Figure 3:
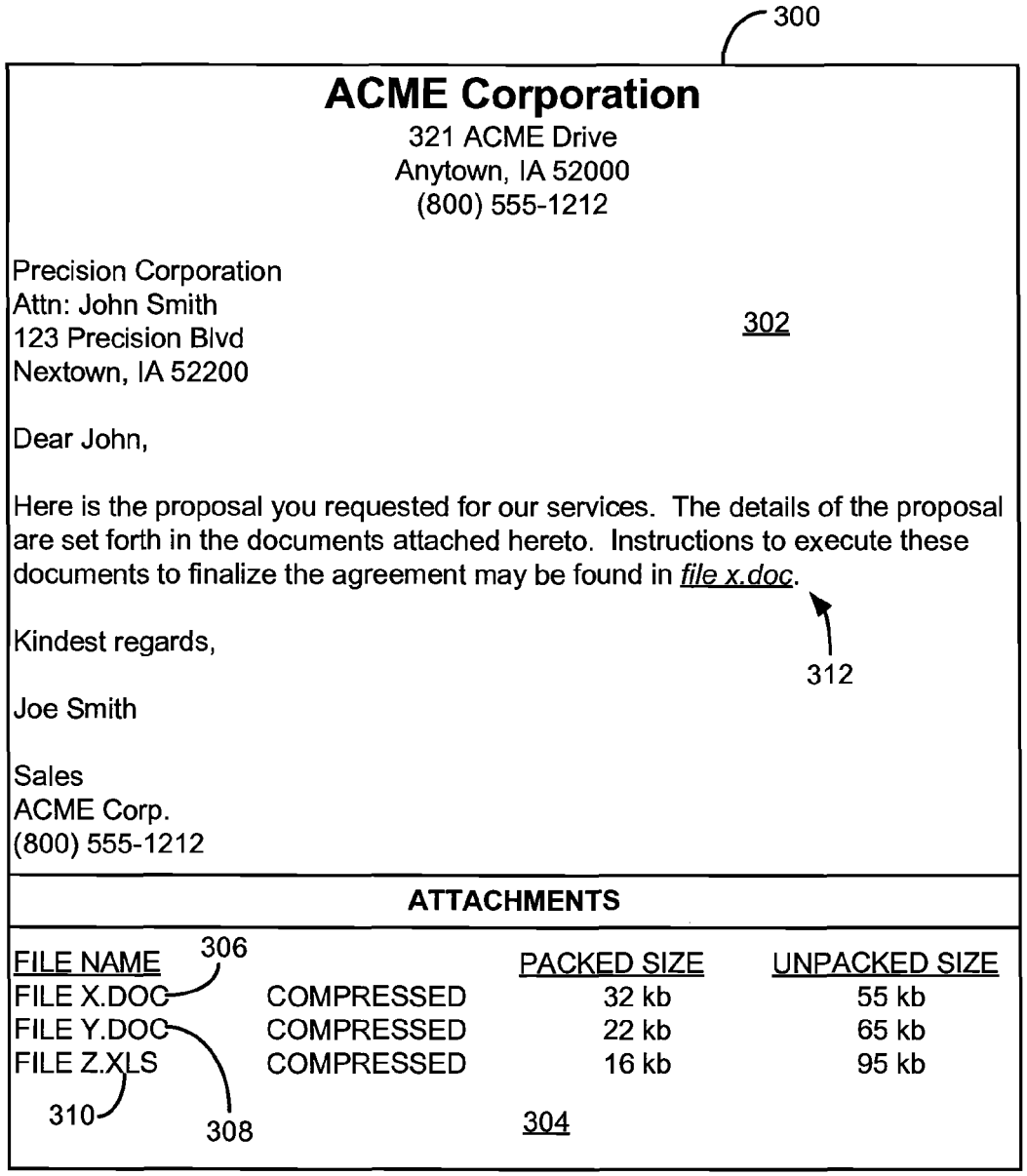
FIG. 3 is a user interface diagram of a page description language reader application including a packaged asset detail pane according to an example embodiment.

FIG. 3 is a user interface diagram 300 of a page description language reader application including a packaged asset detail pane 304 according to an example embodiment. In typical embodiments, text of a page description language file is displayed in a document pane 302 of the application. Assets 306, 308, and 310 attached or embedded in the page description language file may be displayed in the asset detail pine 304. There may be one or more assets displayed in the asset detail pane 304. One or more of these assets may be a compressed file of a compressed archive interleaved within the page description language file. When an asset is selected, the page description language reader application causes an operating system of a computing device upon which the page description language reader application is executing to call a process to decompress the selected asset if the asset is compressed. The decompressed asset is then opened by an application designated within the operating system to open files of the asset type. Although the compressed assets 306, 308, 310 are displayed in the asset detail pane, some embodiments may include displaying a link to view a compressed asset within text of the page description language file. For example, the text of the page description language file displayed in the document pane 302 may include one or more hyperlinks 312 to one or more of the compressed assets 306, 308, 310 interleaved within the page description language file.

Figure 4:
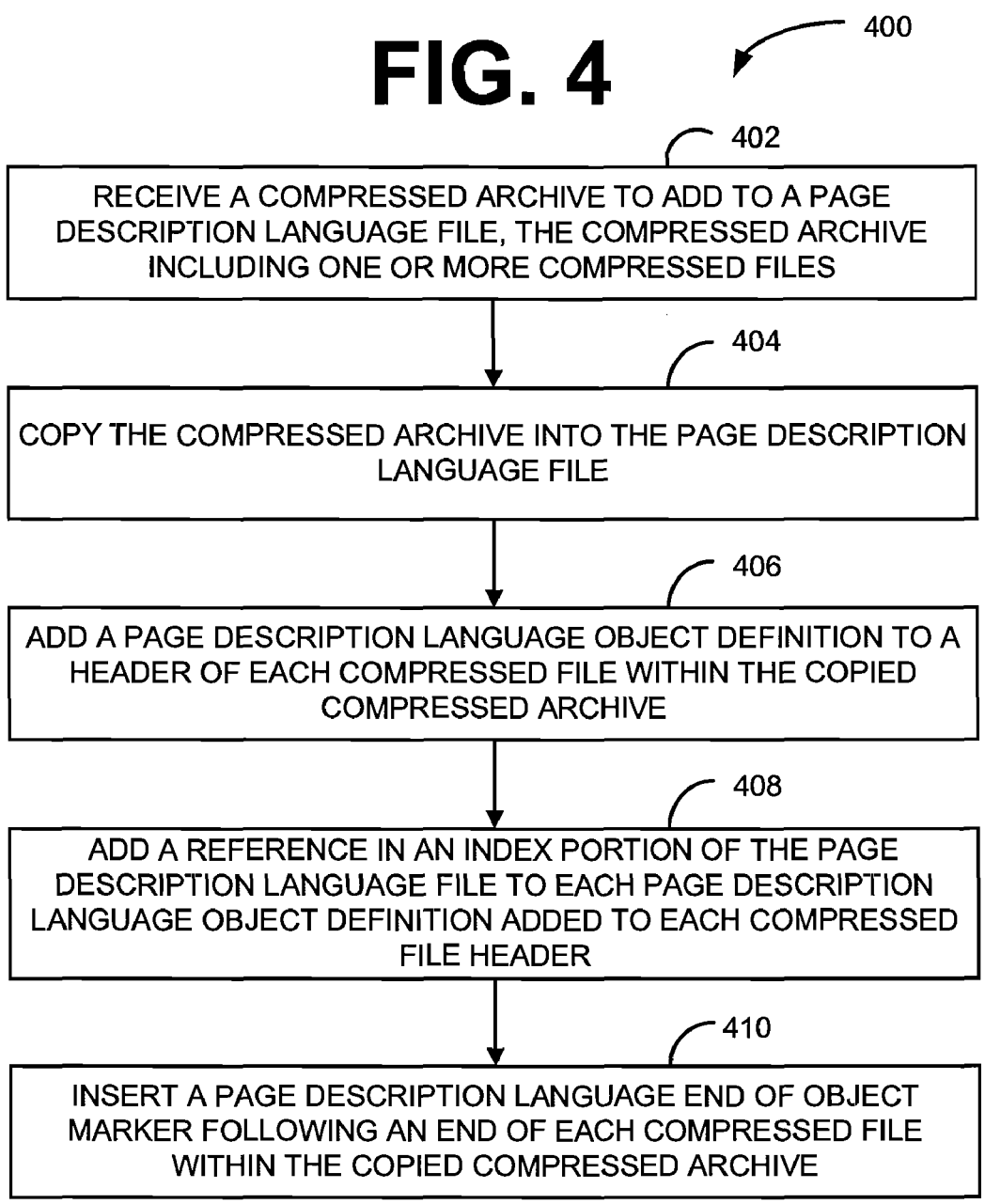
FIG. 4 is a logical block flow diagram of a method according to an example embodiment.

FIG. 4 is a logical block flow diagram of a method 400 according to an example embodiment. The example method 400 is one embodiment of a method of building a page description language file with a compressed archive interleaved therein. This embodiment of the example method 400 includes receiving a compressed archive to add to a page description language file, the compressed archive including one or more compressed files 402 and copying the compressed archive into the page description language file 404. The method 400 further includes adding a page description language object definition to a header of each compressed file within the copied compressed archive 406 and adding a reference in an index portion of the page description language file to each page description language object definition added to each compressed file header 408. The method 400 also includes inserting a page description language end of object marker following an end of each compressed file within the copied compressed archive 410. The portions of the method 400 may be performed is virtually any order.

In some such embodiments of the method 400, inserting a page description language end of object marker following an end of each compressed file 410 includes inserting a page description language end of object marker following a compressed file a number of bytes greater than or equal to a number of bytes specified in a length of file portion of the compressed archive for the compressed file. This may also include shifting data in the compressed archive following a last byte of the compressed file toward an end of the compressed archive at least a number of bytes equal to a number of bytes of the page description language end of object marker to be inserted. In some embodiments, shifting the data toward the end of the compressed archive includes increasing a number of bytes of the compressed archive by the number of bytes the data is shifted.

In some embodiments, a page description language reading application, when accessing a page description language file including a compressed archive, processes the compressed files by reading the index portion of the page description language file to locate each compressed file page description language object definition and reading data of the compressed file identified by the page description language object definition until the page description language end of object marker is located. The reading application may then send the data of the read compressed file to an application on a computing device configured to open compressed files.

Figure 5:
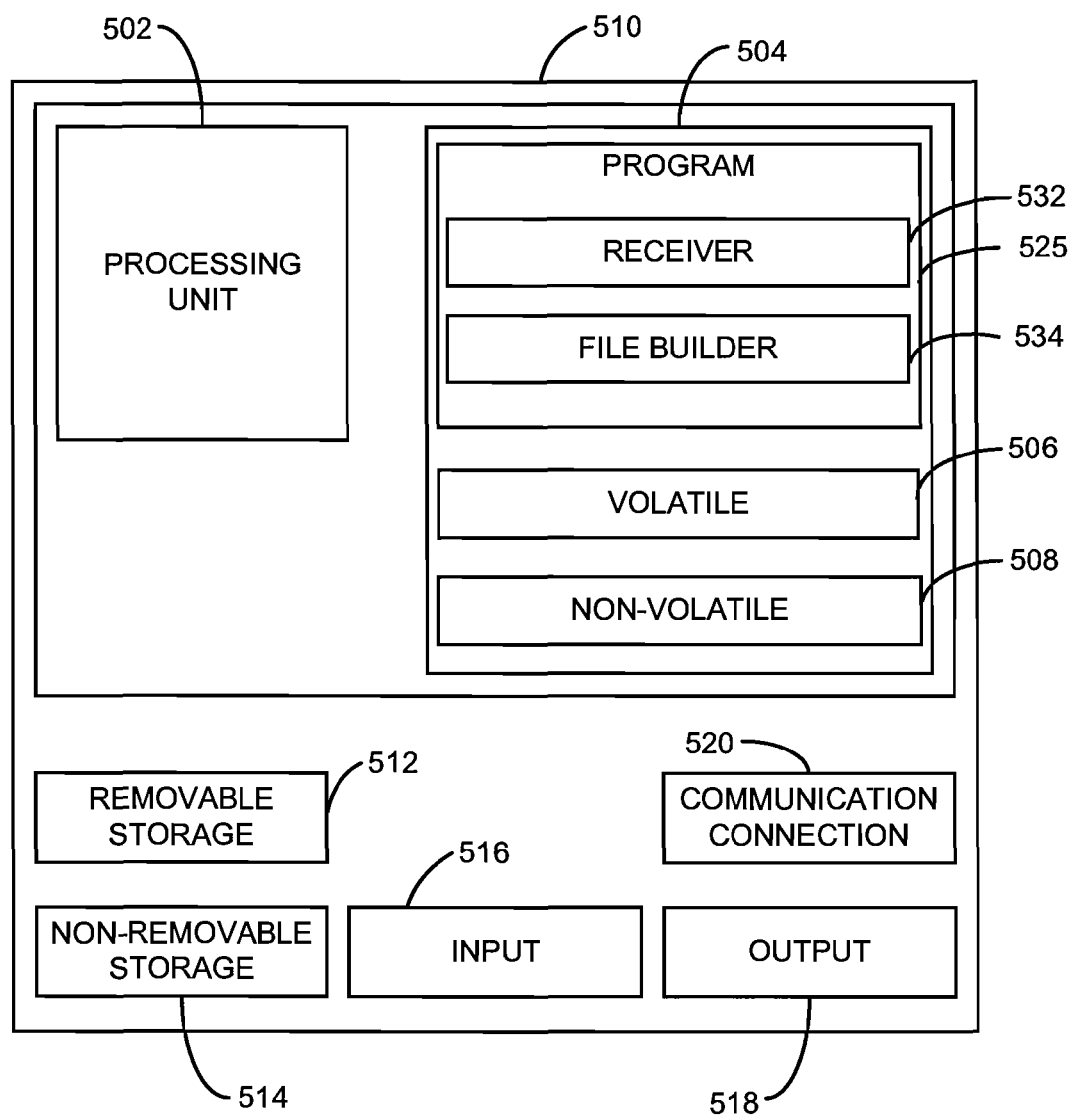
FIG. 5 is a block diagram of a computing device according to an example embodiment.

FIG. 5 is a block diagram of a computing device according to an example embodiment. In one embodiment, multiple such computer systems are utilized in a distributed network to implement multiple components in a transaction based environment. An object oriented architecture may be used to implement such functions and communicate between the multiple systems and components. One example computing device in the form of a computer 510, may include a processing unit 502, memory 504, removable storage 512, and non-removable storage 514. Memory 504 may include volatile memory 506 and non-volatile memory 508. Computer 510 may include—or have access to a computing environment that includes—a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 510. A hard drive, CD-ROM, and RAM are some examples of articles which may store a computer-readable medium. An example computer readable medium if program 525. The program 525, in some embodiments, is a program that processes data to perform one or more of building and reading page description language files. In some embodiments, the program may include one or more modules such as a receiver 532 to receive content including one or more compressed archives, each compressed archive including one or more compressed files, and a file builder 534 to interleave the one or more compressed archives within a page description language file including an object definition within a header of each compressed file of each compressed archive. The receiver 532 may receive the data of the one or more compressed files when one or more processes of the receiver 532 are called. In other embodiments, the receiver may receive a memory address or other identifier of a location where one or more compressed archives are stored. These modules 532, 534, and others may store such files in one or more storage devices, such as the memory 504, the removable storage 512, the non-removable storage 514, or other storage device.

FIG. 6 is a logical block flow diagram of a method 600 according to an example embodiment. The example method 600 is one example of opening a compressed file of a compressed archive interleaved within a page description language file. The example method 600 includes receiving a selection of a compressed file object within a page description language file 602 displayed within a user interface and reading data of the page description language file following an object definition identifier of the compressed file object until an end-of-object identifier is reached 604. The data may then be sent to an application, such as through passing a memory address to the application, designated within an operating system of a computing device performing the method 600. Before the data is sent to the designated application, the data may be passed through a data decompression utility to decompress the data of the compressed file. The method 600 further includes opening the compressed file object 606.

One or more ability to build, read, and edit page description language files including interleaved compressed archives and compressed files may also be embedded within other applications or utilities. For example, an application or utility that may be used to build compressed archives may also provide the ability to compress the files of one or more compressed archives into a page description language file. In some embodiments, a compressed archive application or utility may build compressed archives to allow simplified interleaving into a page description language file such as by leaving unused bytes in headers and between compressed files within compressed archives.

Some further method embodiments include receiving a compressed archive to be associated with a page description language file that conforms to a page description language. Such methods may then wrap the compressed archive in a wrapper conforming to the page description language and associate the compressed archive with the page description language file. In some such embodiments, associating the compressed archive with the page description language file includes embedding the compressed archive within the page description language file.

Some other embodiments include a page description language data structure. Such as page description language data structure may include one or more compressed archives embedded within a page description language file, a page description language object marker within a header of each compressed file of the one or more compressed archives, and an entry in an index portion of the page description language file for each compressed archive page description language object marker. The page description language may be Portable Document Format or other page description language depending on the specific embodiment. In some further embodiments, the index portion of the page description language file may be a Portable Document Format file trailer. When reading such a data structure, a page description language file reading application may directly access compressed files within the one or more embedded compressed archives with reference to a respective page description language object marker.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   receiving a compressed archive to add to a page description language file, the compressed archive including one or more compressed files;
   copying the compressed archive into the page description language file;
   adding a page description language object definition to each compressed file within the copied compressed archive;
   adding a reference to the page description language file to each page description language object definition added to each compressed file;
   inserting a page description language end of object marker following an end of each compressed file within the copied compressed archive; and
   storing the page description language file on a data storage device.

2. The method of claim 1, wherein inserting the page description language end of object marker following the end of each compressed file includes:
   Inserting a page description language end of object marker following a compressed file a number of bytes at least equal to a number of bytes specified in a compressed archive header length of file entry for the compressed file.

3. The method of claim 2, wherein inserting the page description language end of object marker following the end of each compressed file further includes:
   shifting data in the compressed archive following a last byte of the compressed file toward en end of the compressed archive at least a number of bytes equal to a number of bytes of the page description language end of object marker to be inserted.

4. The method of claim 3, wherein the shifting of the data toward the end of the compressed archive includes increasing a number of bytes of the compressed archive by the number of bytes that the data is shifted.

5. The method of claim 1, wherein a page description language reading application, when accessing the page description language file including the compressed archive, processes the compressed files by:
   reading the index portion of the page description language file to locate each compressed file page description language object definition;
   reading data of the compressed file identified by the page description language object definition until the page description language end of object marker is located; and
   sending the data of the read compressed file to an application on a computing device configured to open compressed files.

6. A machine-readable medium, with instructions encoded thereon, which when executed because a suitably configured machine to:
   receive a compressed archive including one or more compressed files to add to a page description language file;
   add the compressed archive to the page description language file in a manner allowing a page description language reading application to read the page description language file and locate the one or more compressed files within the compressed archive, the adding of the compressed archive to the page description language file including:
   placing the compressed archive within the page description language file;
   inserting a page description language object definition into each header of each compressed file;
   inserting an index to each page description language object definition in a trailer of the page description language file; and
   inserting a page description language end of object marker following an end of each compressed file; and
   store the page description language file.

7. The machine-readable medium of claim 6, wherein the page description language is Portable Document Format.

8. The machine-readable medium of claim 6, wherein the instructions to insert the page description language end of object marker following the end of each compressed file includes instructions, which when processed cause the suitably configured machine to:

insert a page description language end of object marker following a compressed file a number of bytes at least equal to a number of bytes specified in a length of file portion of the compressed archive for the compressed file.

9. The machine-readable medium of claim 8, wherein the instructions to insert the page description language end of object marker following the end of each compressed file include instructions, which when processed cause the suitably configured machine to:

shift data in the compressed archive following a last byte of the compressed file toward an end of the compressed archive at least a number of bytes equal to a number of bytes of the page description language end of object marker to be inserted.

10. A system comprising:
a processor;
a memory;
a data storage device;
an instruction set stored in the memory including instructions executable on the processor, the instructions set defining:
a receiver to receive content including one or more compressed archives, each compressed archive including one or more compressed files;
a file builder, the instructions of which when executed by the processor cause the system to perform a method comprising:
copying the one or more compressed archives received by the receiver into a page description language file;
adding a page description language object definition to each compressed file within the one or more copied compressed archives;
adding a reference to the page description language file to each page description object definition added to each compressed file;
inserting a page description language end of object marker following an end of each compressed file within the one or more copied compressed archives; and
storing the page description language file on the data storage device.

* * * * *

UNITED STATES PATENT AND TRADEMARK OFFICE
CERTIFICATE OF CORRECTION

PATENT NO. : 7,823,064 B1  
APPLICATION NO. : 11/848056  
DATED : October 26, 2010  
INVENTOR(S) : Philip Levy Page 1 of 1

It is certified that error appears in the above-identified patent and that said Letters Patent is hereby corrected as shown below:

In column 8, line 9, in Claim 2, delete "Inserting" and insert -- inserting --, therefor.

In column 8, line 18, in Claim 3, delete "en" and insert -- an --, therefor.

In column 8, line 42, in Claim 6, delete "because" and insert -- cause --, therefor.

In column 10, line 16, in Claim 10, after "description" insert -- language --.

Signed and Sealed this
Twenty-eighth Day of December, 2010

David J. Kappos
*Director of the United States Patent and Trademark Office*